Aug. 24, 1948.　　　　L. G. RILEY　　　　2,447,669
REMOTE CONTROL SYSTEM
Filed Feb. 8, 1943　　　　　　　　　　　2 Sheets-Sheet 1

WITNESSES:

INVENTOR
Lynn G. Riley.
BY
ATTORNEY

Aug. 24, 1948.          L. G. RILEY          2,447,669
REMOTE CONTROL SYSTEM
Filed Feb. 8, 1943                 2 Sheets-Sheet 2
Fig. 2.
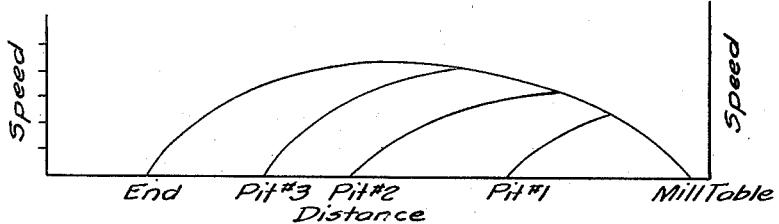
Fig. 3.
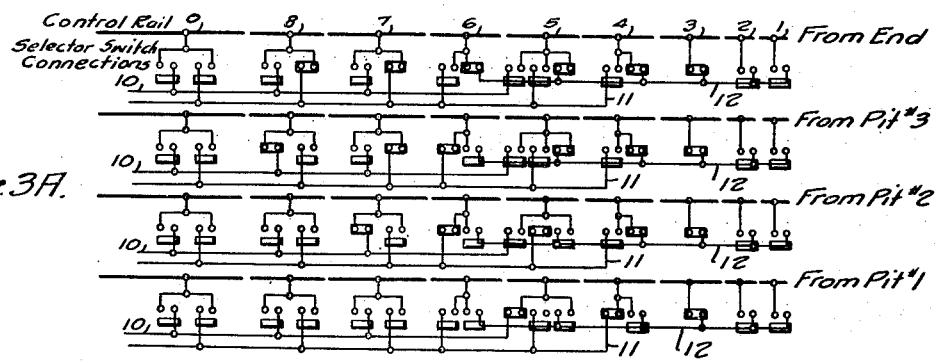
Fig. 3A.
WITNESSES:
E. A. McCloskey.
R. S. Elliott
INVENTOR
Lynn G. Riley.
BY
J. M. Crawford
ATTORNEY Patented Aug. 24, 1948

2,447,669

UNITED STATES PATENT OFFICE 2,447,669

REMOTE-CONTROL SYSTEM

Lynn G. Riley, Pittsburgh, Pa., assignor to Westinghouse Electric Corporation, East Pittsburgh, Pa., a corporation of Pennsylvania Application February 8, 1943, Serial No. 475,216

7 Claims. (Cl. 104—149)

My invention relates, generally, to control systems and, more particularly, to systems for remotely controlling the operation of electrically-propelled vehicles.

For certain applications, as for example in steel mills where it is necessary to transfer hot steel ingots from several soaking pit locations to the end of the blooming mill table, it is desirable to provide for automatically controlling the operation of an ingot car because of poor visibility of all stops from a fixed operating station.

An object of my invention, generally stated, is to provide a system for remotely controlling the operation of an electrically-propelled transfer or ingot car which shall be simple and efficient in operation and which may be economically manufactured and installed.

A more specific object of my invention is to provide for the preselection of each of several different lengths of travel for an ingot car.

Another object of my invention is to provide for the preselection of round trip operation of an ingot car between two stations.

A further object of my invention is to provide for automatically transferring the motor of a vehicle from power to dynamic brake connections at predetermined points in the travel of the vehicle.

Still another object of my invention is to provide for the joint operation of a dynamic and a mechanical brake.

A still further object of my invention is to provide for the unloading of an ingot from a car to a table.

Still another object of my invention is to provide for "inching" an ingot car at any location throughout its range of travel.

Other objects of my invention will be explained fully hereinafter or will be apparent to those skilled in the art.

In accordance with my invention, both the traction motor and the roll or unloading motor of an ingot car are operated by remote contactor control from a pulpit through collector shoes and contact rails. The round trip operating cycle between the mill table and each of several different pit locations is automatic except for the application of power to the traction motor at the beginning of each one-way trip. After the operator has started the car by means of a master switch, the acceleration, power off, dynamic brake and magnet brake cycle of operation is fully automatic and brings the car to a stop at the pit which has been preselected. The return trip is performed in the same manner whenever power is applied in the opposite direction, by reversing the position of the master switch. The accidental unloading of an ingot on the track is avoided by preventing operation of the roll motor except while the car is standing at the mill table.

For a fuller understanding of the nature and objects of my invention, reference may be had to the following detailed description, taken in conjunction with the accompanying drawing, in which:

Fig. 2 is a chart showing the sequence of operation of the switches illustrated in Fig. 1;

Fig. 3 is a speed-distance curve for the traction motor of the car; and

Fig. 3A is a diagrammatic view showing the control rail and selector switch connections for controlling the operation of the car from the different pit locations.

Figure 1:
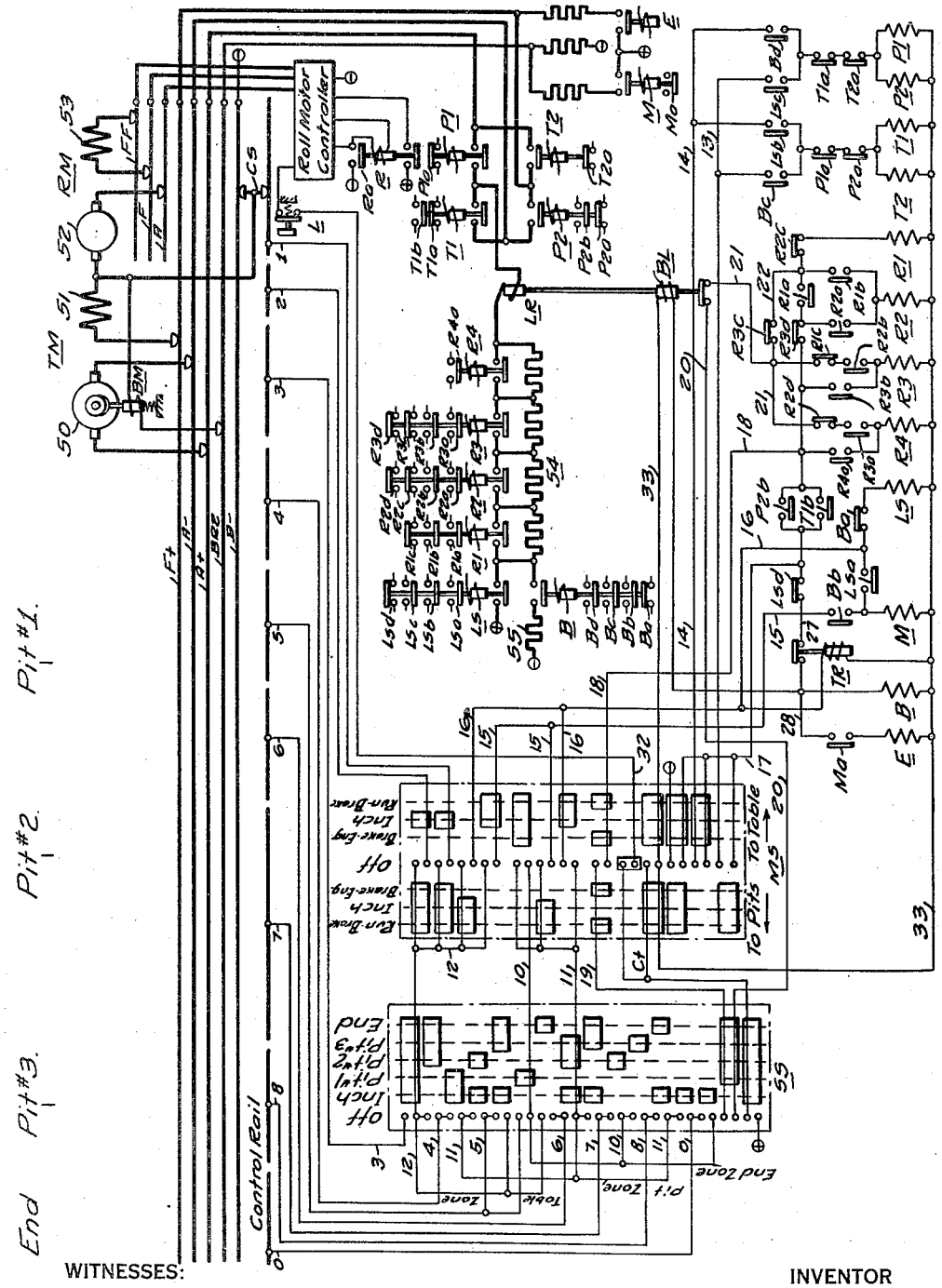
Figure 1 is a diagrammatic view of a control system embodying my invention.

Referring to the drawings, and particularly to Fig. 1, the system shown therein comprises a traction motor TM, having an armature winding 50 and a field winding 51, and a roll motor RM, having an armature winding 52 and a field winding 53. As explained hereinbefore, the traction motor TM is utilized for propelling an ingot car (not shown) and the roll motor RM is utilized for transferring the steel ingot from the car to a rolling mill table (not shown). The traction motor is provided with a spring applied magnet brake which is released by the energization of a solenoid coil BM.

The speed-distance curve shown in Fig. 3 is a chart of power, and brake cycle performance for each of the four runs from a pit location to the mill table. The accelerating and braking rates are approximately equal, so that it is necessary to shut off the power and apply the dynamic brake midway between the starting and the stopping points. On the short runs the car does not reach full speed. These automatic functions are made possible by completing the master return circuit for the contactor control through a control rail having nine sections and engaged by a negative collector shoe on the car.

Since all controllers and contactors are mounted at a pulpit each motor requires three collector rails for applying power and reversing the direction of movement. Collector rails A+, A− and F+ are provided for the traction motor, and collector rails A, F and FF are provided for the roll motor. The drum brake mounted on the traction motor armature shaft requires a separate release rail BR2 and there is a common return collector rail B— for all apparatus on the car. This makes a total of eight power collector rails, in addition to the sectionalized control rail. Three of these are very short since the roll motor is operated only when the car is standing at the mill table. The other six rails extend the full length of the track.

As indicated in the sequence chart in Fig. 2 and the diagram, there are five series resistor starting notches and five dynamic brake notches, both operations using the same set of reversing and resistor contactors. In changing from power to brake, a power supply contactor LS is operated and a braking loop contactor B is closed. The motor armature is also reversed and a field excitation switch E is closed to cause the motor to build up as a generator. Resistor-shunting switches R1, R2, R3 and R4 are provided for shunting a series resistor 54 from the motor circuit. An extra block of permanent series resistance 55 is included in the braking loop to stabilize the dynamic braking action which fades out at low speed.

The first notch passes less than full load current and is utilized for "inching" operations. The sequence chart indicates the sequence in which the contactors close for each of the power and brake operations. All of the resistor and reversing contactors are opened when transferring from power to brake connections. The progression from notch to notch is controlled by a system of automatic interlocking, and the maximum current rate is controlled by a current limit relay LR, which interrupts the resistor switch progression whenever the traction motor load exceeds the relay setting.

A separate roll motor controller is utilized to start and stop the roll motor for unloading the ingot. A line contactor R is so interlocked with the traction motor control that operation of the roll motor is prevented except while the car is standing at the mill table and the traction power is cut off. This is to aviod accidently unloading an ingot on the track. The control of the roll motor is not automatic, and will not be described in detail in the present application.

The four traction motor resistor-shunting contactors R1, R2, R3, and R4 are progressively interlocked to close in regular sequence under the control of the current limit relay. The progression is the same for power or brake, but the setting of the relay LR is automatically reduced by a shunt booster coil BL during braking. There are four reversing contactors P1, P2, T1 and T2 which perform the double duty of reversing the direction of motion during motoring and of changing the motor armature polarity during dynamic braking.

While motoring, the contactor LS applies power to the motor. The contactor B completes the resistor loop for dynamic braking and is mutually interlocked with the contactor LS so both cannot be closed at the same time. The contactor E is closed with the contactor B, and pre-excites the motor field through a resistor to insure prompt build-up of the braking load.

The spring applied drum brake is held in release by the closing of the contactor M during power or brake operation, and is applied at the end of each run, or whenever the braking contactor B is not closed, such as during the transition from power to brake. This insures prompt braking under all conditions.

Each contactor includes an electrical control interlock assembly to insure definite progressive closing and mutual safety protection against false operation. A manually operated selector switch SS and a master switch MS, both of which may be of the drum type, are provided for selecting the range of operation of the ingot car, the direction of operation and the application of power to the traction motor at the beginning of each one-way trip.

By referring to the drawings and particularly to Figs. 3 and 3A, it will be seen that in any of the pit positions, the selector switch short circuits all of the gaps in the selector control rail except the one which is to be used for cutting off power at the midpoint of the travel of the ingot car. It also connects one group of control wires from the selector rail section to a "table zone" and the other group to a "pit zone" circuit supplying the master switch. Power is applied by the "table zone" circuits when the master switch is thrown to the "pit" side and the same function is performed by the "pit zone" circuits when the master switch is thrown to the "table" side.

The application of power depends on the return circuit for the LS and TR relays being completed through energized sections of the selector control rail. The opening of these circuits at the end of the power cycle permits the braking switch B to close independently of the selector rail circuit. This positive feature insures brake operation regardless of the condition of the selector rail and its collector shoe. The function of the transfer relay TR is to interrupt the braking circuit, permitting the line switch LS to close whenever power is to be reapplied. As each transfer from power to brake occurs, a system of interlocking changes the reversing control from one pair of reversing contactors to another pair.

The operator controls all the movements of the ingot car from his station in the control pulpit by manipulation of the three controllers, that is the seven-position reversing master switch MS, the six-position pit selector switch SS, and the roll motor controller. The procedure is as follows:

With the master switch and the roll motor controller both in the "off" position, the selector switch is placed on the position corresponding to the pit to be served. Assuming that the car is standing at the mill table, the master switch is then thrown to the "run and brake" position on the "pit" side. This applies power to the traction motor and the car moves toward the pits. The power is automatically cut off when half the distance has been traversed. The dynamic brake is applied automatically, slowing the car down to approximately two miles per hour, and the stop is completed at the selected pit by automatic application of the magnet brake. The car then stands with the brake applied until the master switch is thrown to the full "run and brake" position in the "table" direction, when the power, dynamic and magnet brake cycle is automatically repeated to bring the car to a stop close to the mill table.

At the table end of the run the car is stopped a few feet short of the end of the mill. By moving the master switch back one notch to the "inch" position, the magnet brake is released and the car can then be moved up slowly until it is in contact with the table. The final gap in the control rail prevents holding the power on at this point and reapplies the magnet brake.

This final movement of the car engages a limit witch L, mounted on the mill, which closes a control circuit for the roll motor contactor R. The circuit is then completed by moving the master switch to the "off" position. The operator can then use the roll motor controller to position and unload the ingot. When ready to return to the pit, the master switch is thrown to the "run and brake" position on the "pit" side, which reverses the direction of rotation of the traction motor, releases the magnet brake and applies power for whatever interval of travel is permitted by the "pit zone" circuit from the selector switch.

For other than normal movements, the "brake emergency" positions on the master switch can be used to stop any time, utilizing the combined dynamic and magnet brakes. The "inch" positions can be used for slow movements in starting from any point in the "power on" zones, as set up by the selector switch. There is also an "inch" position on the selector switch which nullifies all control rail gaps and permits manual control of the car at low speed at any location and in both directions, including the storage space at the end of the track. The "off" position on the selector switch is for convenience in breaking up all control circuits in checking the wiring and inspection.

The control system can probably be understood best by following the circuits through for one typical cycle, such as operating from the No. 3 pit. The operation of the selector switch to the "pit No. 3" position, applies positive potential to the C+ wire which is connected to the master switch. The selector switch also connects the control rail circuits 6 and 7 to the "pit zone" wire 14, the No. 8 circuit to the "end zone" wire 10, and the rail circuits 3, 4 and 5 to the "table zone" wire 12. Actuating the master switch to the "run and brake" position on the "table" side connects the conductors 10 and 11 to the conductor 16, thereby energizing the transfer relay TR through a circuit which may be traced from positive through the selector switch SS, conductor C+, the master switch MS, conductor 33, the actuating coil of the relay TR, conductor 16, the master switch MS, conductor 11, the switch MS, conductor 10, the selector switch SS, conductor 8 and thence to the negative conductor B— through the control rail and the collector shoe CS on the car.

The opening of the contact members of the relay TR interrupts the energizing circuit for the switch B, thereby opening this switch. The opening of the switch B establishes an energizing circuit for the actuating coil of the switch LS through an interlock Ba to the conductor 16 and thence to negative through the circuit previously traced. The closing of the switch LS completes the control circuit for the switches T1 and T2 through a circuit which extends from the conductor 33 through the actuating coils T1 and T2, interlocks P2a and P1a, an interlock LSb, conductor 14, the master switch MS, conductor 17, and the switch MS to negative.

The energizing circuit for all of the resistor-shunting switches is completed through the conductor 18, an interlock T1b on the switch T1, conductor 17 and thence to negative, through the master switch, thereby providing a holding circuit for the resistor-shunting switches. The actual closing circuit for these switches is through conductors 22 and 21, the contact members of the limit relay LR, conductor 20, the selector switch SS, conductor 19, the master switch MS, the conductor 18 and thence to negative through the circuit previously traced. The mutual interlocking of the resistor-shunting switches determines the closing order R1, R2, R3 and R4.

In order to insure against overrunning the limit control, interlocking is also provided to prevent R3 from closing until after R1 opens. Likewise, R4 cannot close until R2 opens. R1 is opened by R2 closing and R2 is opened by R3 closing. This procedure introduces a time interval between notches and permits the limit relay to lift on each notch.

When the collector shoe CS passes over the gap between the No. 6 and No. 5 sections of the control rail, the "pit zone" supply circuit through conductor 14 is interrupted, thereby opening the switches LS, TR, and all of the resistor-shunting switches. An energizing circuit for the actuating coil for the switch B is established from the positive conductor 33 through the coil of the switch B, conductor 28, the contact members of the relay TR, conductor 27, an interlock LSd on the switch LS, conductor 17 and thence to negative through the switch MS.

Following the closing of the switch B, the switch M, which also opened during the transition period is reclosed, thereby releasing the brake magnet BM. The energizing circuit for the switch M extends from the conductor 33 through the actuating coil of the switch M, an interlock Bb, conductor 15, the master switch MS, conductor 12, the selector switch SS, conductor 5 and thence to negative through the control rail and the collector shoe CS.

Following the closing of the switch M, the field excitation switch E is closed to energize the field winding 51 of the traction motor. The energizing circuit for the switch E extends from conductor 33, through the actuating coil of the switch E, an interlock Ma on the switch M, conductor 28, the relay TR, conductor 27, the interlock LSd, conductor 17, and the master switch MS, to negative.

The switches P1 and P2 are closed by the energization of their actuating coils through a circuit which extends from the conductor 33 through interlocks T2a, T1a and Bd, conductor 14 and thence to negative through the master switch. The resistor-shunting switches are reclosed in sequence through a circuit extending from the conductor 18 through an interlock P2b on the switch P2 and thence to negative through the conductor 17 and the master switch MS in the same manner as during acceleration.

The energizing circuit for the switch M is interrupted when the collector shoe passes the gap between the No. 3 and No. 2 sections of the control rail. This permits the magnet brake to apply and assist the dynamic brake in completing the stop. The switch M can be reclosed and power reapplied to the traction motor by moving the master switch back to the "inch" position thereby bridging the gap between the No. 2 and No. 1 sections of the control rail. In this manner the car may be brought to the desired position at the mill table.

As explained hereinbefore, when the car is in the proper position at the mill table, the limit switch L is closed. After the master switch MS is returned to the "off" position the switch R may be closed to energize the roll motor RM by operating the roll motor controller. The energizing circuit for the switch R extends from the conductor C+ through the master switch MS, conductor 32, the limit switch L, and thence to the actuating coil of the switch R through the roll motor controller. A holding circuit for the switch R is established through an interlock Ra on the switch R. As explained hereinbefore, the operation of the roll motor RM is manually controlled by means of the roll motor controller in a manner well known in the art.

In order to return the ingot car to the No. 3 pit, the master switch MS is actuated to the "run brake" position on the pit side. The control rail circuits, 1, 2, 3, 4 and 5 are all connected to the "table zone" wire 12 which energizes the power application conductor 16 for moving the car toward the pit. The T1 and T2 or P1 and P2 are energized through the conductor 13 and the switch MS. The No. 6 and No. 7 sections which are connected to the "pit zone" wire 11 are now connected to the conductor 15 through the master switch, thereby holding the switch closed until the gap between the No. 7 and No. 8 sections is passed.

The power is shut off and the dynamic brake applied when passing over the gap between the No. 5 and No. 6 sections in the same manner as when the car was traveling toward the table. As explained hereinbefore, the magnet brake is applied when the collector shoe is on the No. 8 section to assist in stopping the car at the No. 3 pit.

The operation of the car between the table and any of the other pit locations is similar to that herein described. The desired pit location is selected by means of the selector switch SS. After the operator has started the car by means of the master switch, the acceleration, power off, dynamic brake and magnet brake cycle of operation is fully automatic and brings the car to a stop at the pit which has been selected.

From the foregoing description, it is apparent that I have provided a system for automatically controlling the operation of an electrically propelled vehicle between preselected locations. While the present system has been described as being particularly suitable for controlling the operation of an ingot car, it is evident that it has numerous other applications.

Since many modifications may be made in the apparatus and arrangement of parts without departing from the spirit of my invention, I do not wish to be limited other than by the scope of the appended claims.

I claim as my invention:

1. In a control system, in combination, a motor for propelling a vehicle between a plurality of predetermined stations, a sectionalized control rail engaged by current collecting means on the vehicle, a power conductor engaged by current collecting means on the vehicle, manually operable control apparatus located remotely from the vehicle for preselecting said stations, additional manually operable control apparatus located remotely from the vehicle for controlling the application of power to said motor through said power conductor, automatically operated resistor shunting means for controlling the acceleration of the motor, and automatically operated control means energized through said preselecting control apparatus and located remotely from the vehicle for automatically controlling the establishing of dynamic braking for the motor when the vehicle is substantially midway between the preselected stations, said resistor shunting means also controlling the deceleration of the motor.

2. In a control system, in combination, a motor for propelling a vehicle between a plurality of predetermined stations, a sectionalized control rail engaged by current collecting means on the vehicle, a power conductor engaged by current collecting means on the vehicle, manually operable control apparatus located remotely from the vehicle for preselecting said stations, additional manually operable control apparatus located remotely from the vehicle for controlling the application of power to said motor through said power conductor, and automatically operated resistor shunting means energized through said preselecting control apparatus and located remotely from the vehicle for automatically controlling the acceleration and dynamic braking of the motor, said dynamic braking being applied when the vehicle is substantially midway between the preselected stations.

3. In a control system, in combination, a motor for propelling a vehicle between a plurality of predetermined stations, a sectionalized control rail, current-collecting means on the vehicle for engaging said control rail, control means located remotely from the vehicle for preselecting said stations, automatically operated resistor shunting means located remotely from the vehicle for controlling the acceleration and the deceleration of the vehicle, and relay means responsive to the passing of said current-collecting means from one section of said control rail to another for automatically changing from acceleration to deceleration of the vehicle when it is substantially midway between said preselected stations, said sections being selected by said preselecting control means.

4. In a control system, in combination, a motor for propelling a vehicle between a plurality of predetermined stations, a sectionalized control rail, current-collecting means on the vehicle for engaging said control rail, manually operable control means located remotely from the vehicle for preselecting said stations and for controlling the application of power to the motor, automatically operated resistor shunting means located remotely from the vehicle for controlling the acceleration and the deceleration of the vehicle, and additional control means located remotely from the vehicle and responsive to the passing of said current-conrolling means from one section of said control rail to another for automatically disconnecting the motor from the power source and establishing a dynamic braking circuit for the motor when the vehicle is substantially midway between said preselected stations, said sections being selected by said preselecting control means.

5. In a control system, in combination, a motor for propelling a vehicle between a plurality of predetermined stations, a mechanical brake on the vehicle, a sectionalized control rail, control means located remotely from the vehicle for controlling the application of power to the motor and for preselecting said stations, and additional control means located remotely from the vehicle and responsive to conditions of said control rail for automatically disconnecting the motor from the power source and establishing a dynamic braking circuit for the motor when the vehicle is substantially midway between said preselected stations, said additional control means also controlling the operation of said mechanical brake, the conditions of said control rail being determined by said preselecting control means.

6. In a control system, in combination, a motor for propelling a vehicle between a plurality of predetermined stations, a mechanical brake on the vehicle, a sectionalized control rail, control means located remotely from the vehicle for controlling the application of power to the motor and for preselecting said stations, additional control means located remotely from the vehicle and responsive to conditions of said control rail for automatically disconnecting the motor from the power source and establishing a dynamic braking circuit for the motor when the vehicle is substantially midway between said preselected stations, and means located remotely from the vehicle and also responsive to conditions of said control rail for controlling the application of said mechanical brake in conjunction with the dynamic brake, the conditions of said control rail being determined by said preselecting control means.

7. In a control system, in combination, a motor for propelling a vehicle between a plurality of predetermined stations, a mechanical brake on the vehicle, a sectionalized control rail, current-collecting means on the vehicle for engaging said control rail, control means located remotely from the vehicle for controlling the application of power to the motor and for preselecting said stations, and additional control means located remotely from the vehicle and responsive to the passing of said current-collecting means from one section of the control rail to another for automatically disconnecting the motor from the power source and establishing a dynamic braking circuit for the motor when the vehicle is substantially midway between said preselected stations, said additional control means also controlling the operation of said mechanical brake, said sections being selected by said preselecting control means.

LYNN G. RILEY.

REFERENCES CITED

The following references are of record in the file of this patent:

UNITED STATES PATENTS

| Number | Name | Date |
| --- | --- | --- |
| 1,022,935 | Gattie et al | Apr. 9, 1912 |
| 1,185,842 | Sessions | June 6, 1916 |
| 1,347,890 | Bright et al. | July 27, 1920 |
| 1,355,533 | Bright | Oct. 12, 1920 |
| 1,412,528 | Johnston | Apr. 11, 1922 |
| 1,416,033 | Johnston | May 16, 1922 |
| 1,739,330 | Seeger | Dec. 10, 1929 |
| 1,940,887 | Schaelchlin et al. | Dec. 26, 1933 |
| 2,120,751 | Jenney | June 14, 1938 |
| 2,204,023 | Mason | June 11, 1940 |
| 2,254,285 | Harris et al. | Sept. 2, 1941 |
| 2,317,175 | Burdick | Apr. 20, 1943 |

FOREIGN PATENTS

| Number | Country | Date |
| --- | --- | --- |
| 321,781 | Great Britain | Nov. 21, 1929 |